(12) United States Patent
Totale et al.

(10) Patent No.: US 10,685,085 B2
(45) Date of Patent: Jun. 16, 2020

(54) METHOD AND SYSTEM FOR IMPLEMENTING CONTEXT BASED DISPLAY OF OBJECTS IN WEB APPLICATIONS USING LINK RELATIONSHIPS

(71) Applicant: OPEN TEXT CORPORATION, Waterloo (CA)

(72) Inventors: Sachin Gopaldas Totale, Pleasanton, CA (US); Lan Wu, Oakville (CA); Yuhui Zhao, San Jose, CA (US)

(73) Assignee: Open Text Corporation, Waterloo (CA)

( * ) Notice: Subject to any disclaimer, the term of this patent is extended or adjusted under 35 U.S.C. 154(b) by 0 days.

(21) Appl. No.: 16/363,865

(22) Filed: Mar. 25, 2019

(65) Prior Publication Data

US 2019/0220501 A1 Jul. 18, 2019

Related U.S. Application Data

(63) Continuation of application No. 15/969,457, filed on May 2, 2018, now Pat. No. 10,261,981, which is a continuation of application No. 15/633,282, filed on Jun. 26, 2017, now Pat. No. 9,990,342, which is a
(Continued)

(51) Int. Cl.
*G06F 17/22* (2006.01)
*G06F 16/955* (2019.01)
*G06F 40/14* (2020.01)

(52) U.S. Cl.
CPC ........ *G06F 17/2235* (2013.01); *G06F 16/955* (2019.01); *G06F 40/14* (2020.01)

(58) Field of Classification Search
CPC . G06F 17/2235; G06F 17/2247; G06F 16/955
See application file for complete search history.

(56) References Cited

U.S. PATENT DOCUMENTS

| 8,555,159 B1 | 10/2013 | Shmulevich et al. |
| 8,595,613 B1 * | 11/2013 | Mills ....................... G06F 3/048 715/234 |
| 8,661,555 B2 | 2/2014 | Miseldine |

(Continued)

OTHER PUBLICATIONS

Anastasia Webber, "EMC Community Network—DECN: Understanding the Difference: Users, Roles, Groups, and Permissions", https://community.emc.com/docs/DOC-8899, Nov. 1, 2010, last modified by Jerry Silver on Jan. 12, 2011, 4 pages.

(Continued)

*Primary Examiner* — Asher D Kells
(74) *Attorney, Agent, or Firm* — Sprinkle IP Law Group

(57) ABSTRACT

In general, the technology relates to a method for displaying objects on a webpage. The method includes receiving a request to transition to the webpage in a web application from a device and in response to the request: obtaining a set of object identifiers, providing the set of object identifiers to a link relationship manager and receiving, from the link relationship manager, a set of link relationships. The method further includes providing the set of link relationships and a link relationship evaluator to the device, where the link relationship evaluator only permits objects that are associated with a link relationship from the set of link relationships to be displayed on the device.

25 Claims, 8 Drawing Sheets

Related U.S. Application Data continuation of application No. 14/586,260, filed on Dec. 30, 2014, now Pat. No. 9,710,439.

(56) References Cited

U.S. PATENT DOCUMENTS

| | | | |
|---|---|---|---|
| 8,789,205 B2 | 7/2014 | Ramaswamy et al. | |
| 9,274,669 B1 * | 3/2016 | Funderburk | G06F 3/0481 |
| 9,710,439 B1 | 7/2017 | Totale et al. | |
| 9,990,342 B2 | 6/2018 | Totale et al. | |
| 10,261,981 B2 | 4/2019 | Totale et al. | |
| 2002/0069236 A1 | 6/2002 | Jahnke | |
| 2003/0023674 A1 | 1/2003 | Hildebrand | |
| 2003/0061482 A1 | 3/2003 | Emmerichs | |
| 2005/0262549 A1 | 11/2005 | Ritt et al. | |
| 2010/0058177 A1 * | 3/2010 | Engel | G06F 17/277 715/256 |
| 2011/0307798 A1 | 12/2011 | Guadarrama et al. | |
| 2013/0326433 A1 | 12/2013 | Lehmann et al. | |
| 2014/0115466 A1 | 4/2014 | Barak et al. | |
| 2017/0300460 A1 | 10/2017 | Totale et al. | |
| 2018/0253405 A1 | 9/2018 | Totale et al. | |

OTHER PUBLICATIONS

Anastasia Webber, "EMC Community Network—DECN: Basic Documentum xCP Permission Troubleshooting", https://community.emc.com/docs/DOC-9319, Dec. 15, 2010, last modified by Jerry Silver on Jan. 12, 2011, 7 pages.

Office Action issued for U.S. Appl. No. 14/586,260, dated Dec. 2, 2016, 11 pages.

Office Action issued for U.S. Appl. No. 15/633,282, dated Oct. 3, 2017, 8 pages.

Notice of Allowance issued for U.S. Appl. No. 15/633,282, dated Feb. 2, 2018, 3 pages.

Office Action issued for U.S. Appl. No. 15/969,457, dated Aug. 10, 2018, 8 pages.

* cited by examiner

Supplier Exchange - Edit
xchange-emc.emcondemand.com/Beacon/#saas_beacon_checklistitem/casenodes%2Fsa
Other bookmarks EMC² Supplier Exchange
alex@ngis.com Deliverable FXS-HR1211-PR-2401-PID-0001

OVERVIEW | DISCUSSION | REVIEWERS

ACCEPT    REJECT

Status: Pending
Name: FXS-HR1211-PR-2401-PID-0001
Description: Engineering specifications for cooling element 110-120.
Issue Reason: Approved for As-Built
Revision: 14
Return Code: Reviewed

DOCUMENTS

| Name | Purpose | Last Modified |
|---|---|---|
| Sausage Plant Floor Plan.gif | Primary | 10/03/14 by alex@ngis.com |

No document to display

METHOD AND SYSTEM FOR IMPLEMENTING CONTEXT BASED DISPLAY OF OBJECTS IN WEB APPLICATIONS USING LINK RELATIONSHIPS

CROSS-REFERENCE TO RELATED APPLICATION(S)

This application is a continuation of, and claims a benefit of priority under 35 U.S.C. 120 of the filing date of U.S. patent application Ser. No. 15/969,457, filed May 2, 2018, entitled "METHOD AND SYSTEM FOR IMPLEMENTING CONTEXT BASED DISPLAY OF OBJECTS IN WEB APPLICATIONS USING LINK RELATIONSHIPS," now U.S. Pat. No. 10,261,981, which is a continuation of, and claims a benefit of priority under 35 U.S.C. 120 of the filing date of U.S. patent application Ser. No. 15/633,282, filed Jun. 26, 2017, entitled "METHOD AND SYSTEM FOR IMPLEMENTING CONTEXT BASED DISPLAY OF OBJECTS IN WEB APPLICATIONS USING LINK RELATIONSHIPS", which is a continuation of, and claims a benefit of priority under 35 U.S.C. 120 of the filing date of U.S. patent application Ser. No. 14/586,260, filed Dec. 30, 2014, now U.S. Pat. No. 9,710,439, entitled "METHOD AND SYSTEM FOR IMPLEMENTING CONTEXT BASED DISPLAY OF OBJECTS IN WEB APPLICATIONS USING LINK RELATIONSHIPS", the entire contents of all of which are hereby expressly incorporated by reference for all purposes.

BACKGROUND

A network is a set of interconnected computing devices that may communicate with each other. Web applications are applications that are developed for the network that includes a series of web pages. Each web page may include various user interface components, e.g., buttons, etc.

BRIEF DESCRIPTION OF DRAWINGS

FIGS. 5A-5C show examples of various embodiments of the technology.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description In the following description of FIGS. 1-6, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or place of the embodiments described with regard to a corresponding like-named component in any other figure.

In general, embodiments of the technology relate to a method and system for displaying objects on a webpage. More specifically, embodiments of the technology relate to a method and system that determines which set of objects in a set of possible objects may be displayed on a webpage based on the presence of a link relationship. A given object may be associated with a link relationship in the event that the object is allowed to be displayed in the webpage, where the determination of whether the object is allowed to be displayed on the webpage is based on a current context of the web application.

Figure 1:
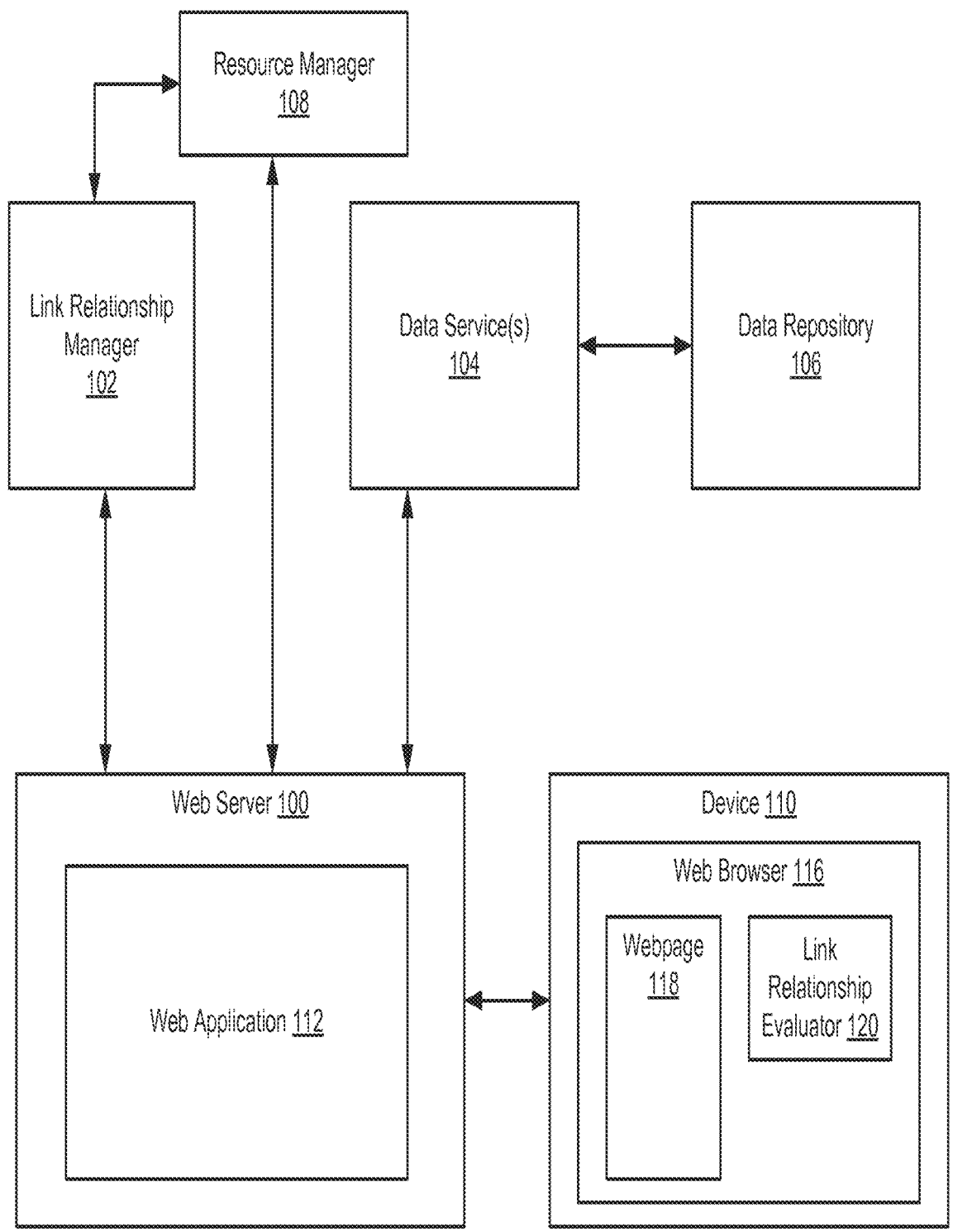
FIG. 1 shows an example system in accordance with one or more embodiments of the technology.

FIG. 1 shows a system in accordance with one or more embodiments of the technology. The system includes a web server (100), a link relationship manager (102), a data service(s) (104), a data repository (106), and a resource manager (108). Each of these components is described below.

In one embodiment of the technology, a web server (100) is a computing system (e.g., a computing system described in FIG. 6) that includes functionality to host a web application (112).

In one embodiment of the technology, a web application (112) refers to an application that is implemented by a web server. The web application includes a series of webpages and logic that is used to: (i) perform various actions on the webpages and (ii) transition between webpages. The end user may interact with the web application via a web browser on a device. The logic associated with the web application (typically in the form of executable code) may be performed by the web server, the client device, or any combination thereof. Further, the logic associated with the web application may also enable the web server to communicate with other web servers, data services, etc.

Continuing with the discussion of FIG. 1, hosting the web application (112) may include storing the necessary files for the web application including source code (e.g., HTML files, JavaScript, CSS files, etc), images, third-party libraries, etc. and then executing the web application (i.e., providing the requested files to the device (110)). Executing the web application may include receiving HTTP requests from a device (110), processing the HTTP request, generating an HTTP response based on the processing of the HTTP request, and providing the HTTP response to the device.

In one embodiment of the technology, the web server (100) may communicate (e.g., send and receive HTTP requests) with one or more end user devices (e.g., the computing systems in FIG. 6) over any wired network, wireless network, or any combination thereof. In one embodiment of the technology, the devices each include at least one web browser (116) that permits the device to display webpages (118) (provided with HTTP responses) to the end users. The web browser (116) may also include functionality to execute computer code (e.g., JavaScript, etc). More specifically, the web browser may include functionality to execute the link relationship evaluator (120), which may be implemented using JavaScript or another programming or scripting language that can perform the functionality described below in FIG. 3.

In one embodiment of the technology, the web server (102) may also interface (directly or indirectly) with one or more data services (104). A data service may be implemented on a computing system (e.g., the computing system in FIG. 6). Further, a data service is an interface to one or more sources of data that are being used by the web application. The data service may receive requests from the web application for certain data. In response, the data service may obtain the requested data from a data repository (106) and provide the obtained data to the web application (112). The data repository (106) corresponds to any combination of hardware and software that is required to persistently store data. For example, the data repository may be implemented as a database that includes a database management system (i.e., software that manages the database) and physical storage, e.g., magnetic storage, optical storage, solid state device, etc.

In one embodiment of the technology, the web server (100) may interface with a resource manager (108). The resource manager (108) may be implemented on a computing system (e.g., a computing system described in FIG. 6). The resource manager (108) includes functionality to obtain (or otherwise determine) the current context of the web application (112), where the context may be maintained on a per-user basis. For example, if user A and user B are both using the web application, then the resource manager (108) may track the context for both user A and user B separately. In one embodiment of the technology, the context corresponds to the state of the web application for a given user. For example, if user A performs a specific action, the performance of that action may change the context of the web application for user A. In another example, context of the web application for a given user may dependent on the particular user regardless of what actions the user is performing. For example, a user that has administrator level privileges is associated with a different context than a user that does not have administrator level privileges. The specific pieces of information that the resource manager uses to determine the context of a particular application may vary based on the implementation of the resource manager.

The resource manager (108) also includes functionality to use the context in order to determine the possible set of valid link relationships that should be provided to the link relationship manager for a given resource or set of resources. The resource manager (108) may apply business logic to the context in order to determine which link relationships to provide to the link relationship manager. In one embodiment of the technology, when the web application transitions to a new web page, the resource manager (108) updates the set of valid links for all resources that are available for the current context of the web application.

In one embodiment of the technology, the resource is a representational state transfer (ReST) resource. A ReST resource is an object with a type, associated data, relationships to other resources (including link relationships), and a set of methods that operate on the ReST resource (e.g., HTTP GET, HTTP POST, HTTP PUT, and HTTP DELETE methods). The ReST resource may be defined using JavaScript Object Notation (JSON). When the ReST resource is defined, the ReST resource includes a set of link relationships, where the set of link relationships correspond to all link relationships associated with the ReST resource.

In one embodiment of the technology, the set of link relationships associated with a given resource may be reduced to a set of valid link relationships. In one embodiment of the technology, the set of valid link relationships for a given resource corresponds to all potential link relationships that are available to a user given the current context of the web application. For example, consider a scenario in which the resource that is being used by the web page is associated with 11 link relationships (i.e., the set of all possible link relationships for the resource) and the current context of the web application for user 1 is context A. Based on the above two inputs, the resource manager may determine that only five of the link relationships are permitted within context A, these five link relationships are collectively referred to as the set of valid link relationships.

In one embodiment of the technology, the web server (100) may also interface with a link relationship manager (102). The link relationship manager (102) may be implemented on a computing system (e.g., a computing system described in FIG. 6). The link relationship manager (102) includes functionality to receive the set of object identifiers for all objects that are associated with a given webpage in the web application and then return link relationships for only those objects that are to be displayed on the webpage. The link relationship manager (102) may make the object determination using the set of valid link relationships obtained from the resource manager (108).

Additional details about the components shown in FIG. 1 are provided in FIGS. 2-5C below.

The technology is not limited to the system configuration shown in FIG. 1. Further, while FIG. 1 shows single instances of various system components, those skilled in the art will appreciate that the system may be multiple instances of one or more system components without departing from the technology.

Figure 2:
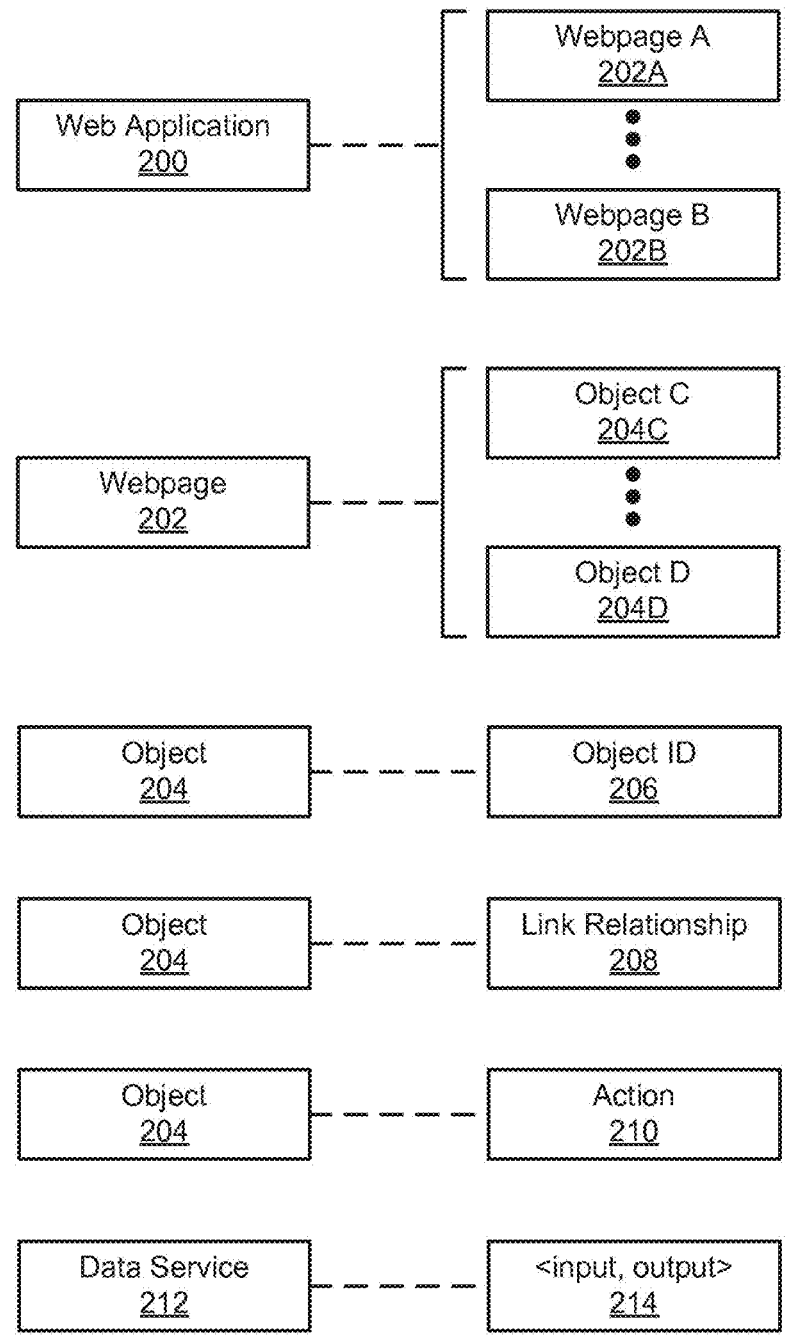
FIG. 2 shows the relationships between various components in the example system in accordance with one or more embodiments of the technology.

FIG. 2 shows the relationship between various components in the system in accordance with one or more embodiment of the technology.

In one embodiment of the technology, each web application (200) includes one or more webpages (202A, 202B). Further, each webpage (202) includes one or more objects (i.e., visible components) (204C, 204D). Examples of objects include, but are not limited to, buttons, menus, context menus, radio buttons, input fields, and text boxes. In one embodiment of the technology, an object is a component on a webpage that may: (i) trigger an action; (ii) obtain input from a user for an action; and/or (iii) display output to a user (via the webpage).

In one embodiment of the technology, each object is associated with an object ID (206), where the object ID may be a numeric value, a character string, or an alphanumeric value. The object ID may uniquely identify the object within the web application.

In one embodiment of the technology, a given object (204) may be associated with a link relationship (208). In one embodiment of the technology, an object may be associated with a link relationship if the object is to be displayed on the webpage. (See e.g., FIG. 3). The link relationship may include a link relationship ID and a uniform resource location (URL). In one embodiment of the technology, the link relationship ID in a link relationship associated with an object is the object ID of the object. In one embodiment of the technology, the URL is used as part of a data service request to a data service (212), where selecting the object (204) triggers a request to the data service. More specifically, in one embodiment of the technology, the URL along with other inputs obtained from the webpage and/or web application are used to generate an asynchronous JavaScript+ XML (AJAX) request. (See e.g., FIG. 4). In one embodiment of the technology, when the resource is defined using JSON, then the link relationship ID is associated with a "rel" tag and the URL is associated with a "href" tag.

In one embodiment of the technology, each object (204) may be associated with an action (210) that when triggered initiates the generation of a data service request. The action is typically performed within the web browser on the device where the results of the action: (i) a data service request being issued to the appropriate data service and (ii) a corresponding response which is subsequently output to/consumed by a target entity (e.g., an object, another action, and/or another data service). The inputs (214) obtained by the action (210) and the output (214) generated by the data service (212) may be defined in a data service contract.

In one embodiment of the technology, the data service contract may be used during the design of the web application to associate the object, action, link relationship, and data service. In addition, the data service contract may also specify the inputs for the data service and the output generated by the data service.

Figure 3:
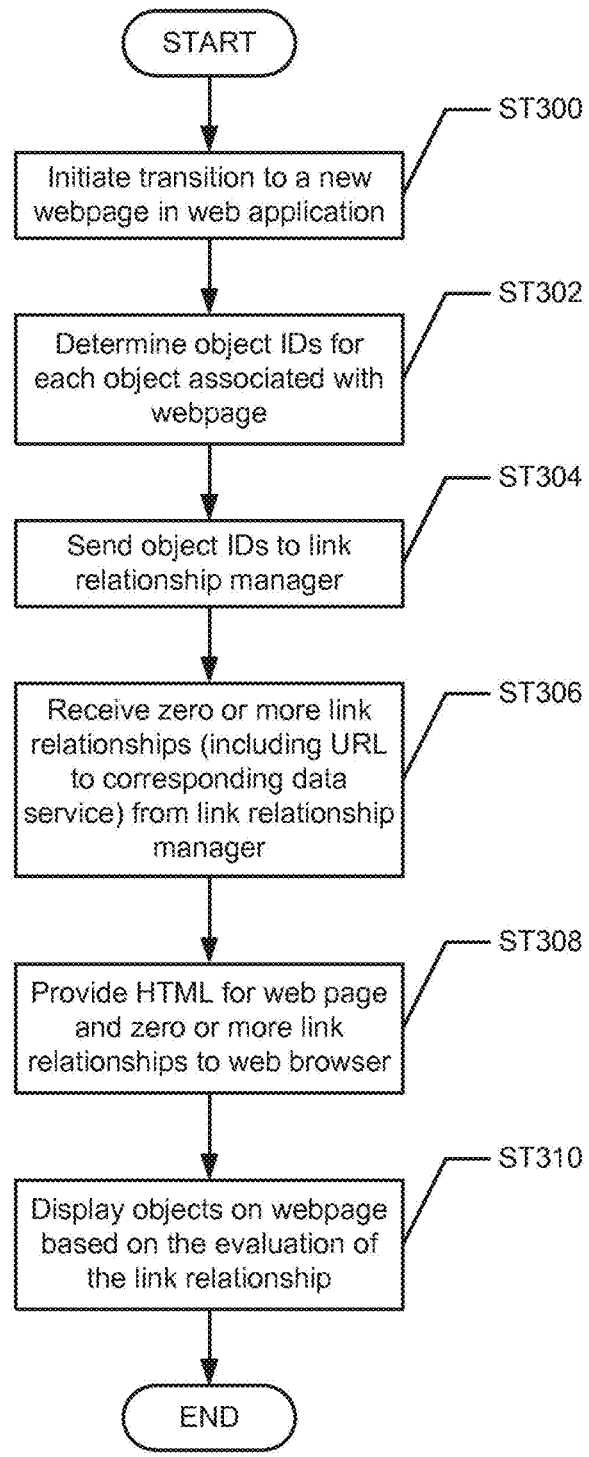
FIG. 3 shows a method for displaying a webpage to a user in accordance with one or more example embodiments of the technology.
Figure 4:
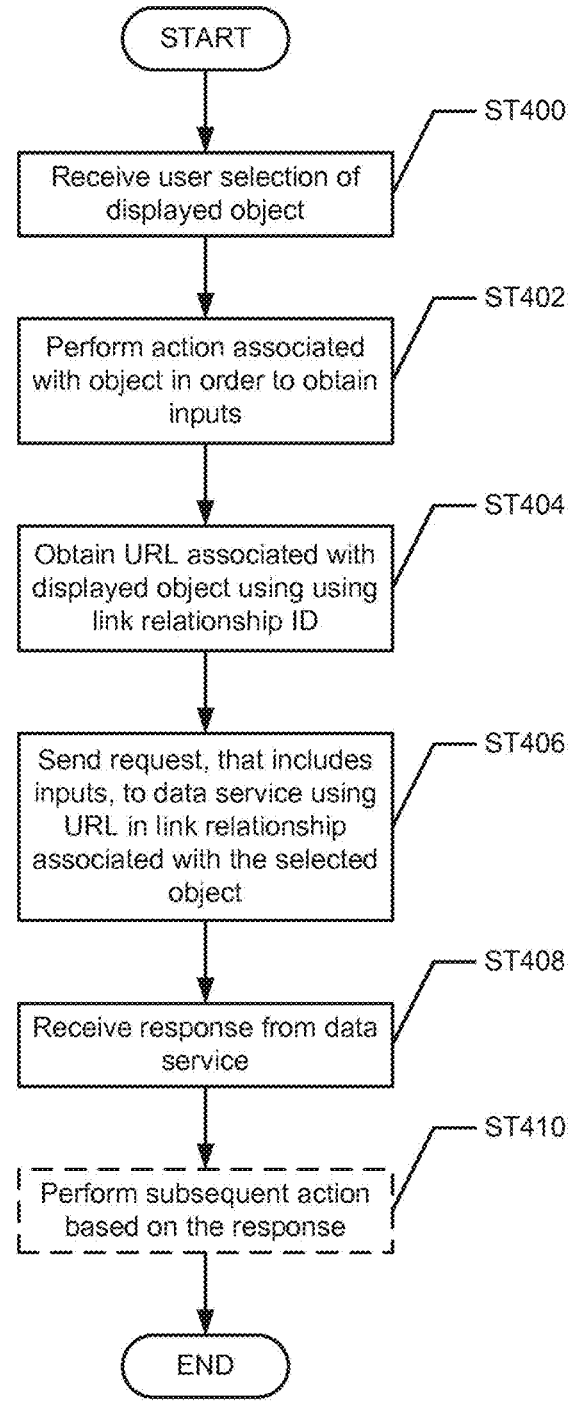
FIG. 4 shows an example method for processing user generated events in a web application in accordance with one or more embodiments of the technology.

Turning to the flowcharts in FIGS. 3 and 4, while the various steps in the flowcharts are presented and described sequentially, one of ordinary skill will appreciate that some or all of the steps may be executed in different orders, may be combined or omitted, and some or all of the steps may be executed in parallel.

FIG. 3 shows a method for displaying a webpage to a user in accordance with one or more embodiments of the technology.

In step 300, the transition to a new web page in the web application is initiated. The initiation of the transition to the webpage may be triggered by receiving an HTTP request from the device. In response to receiving the HTTP request (or any other event that may trigger the transition to the webpage), the resource manager (108) may be notified of the transition and may proceed to update the set of valid link relationships for all resources that are available to the user of the web application based on the current context of the web application. The resource manager (108) may obtain the current context of the web application from: (i) the web server and/or (ii) another computing system that is tracking the current context of the web application. Alternatively, the resource manager (108) may include functionality to track the current context of the web application and, as such, already includes the current context of the web application after it has transitioned to the web page. The resource manager (108) may subsequently provide the set of valid links to the link relationship manager at any time prior to Step 308. Alternatively, the link relationship manager may request the updated set of valid links any time prior to step 308.

In step 302, the objects IDs for all objects on the new web page are identified. The object IDs may correspond to all possible objects that may displayed on the web page regardless of context (see e.g., FIG. 5A). The object IDs for all objects on the web page may be obtained by processing the HTML for the webpage.

In step 304, the object IDs obtained in step 302 are provided to the link relationship manager (e.g., FIG. 1, 102). The link relationship manager subsequently determines which link relationships to provide to the web application. More specifically, in one embodiment of the technology, the link relationship manager attempts to match each object ID obtained in step 302 with a link relationship from set of valid link relationships that were determined (e.g., by the resource manager) using the current context of the web application. An object ID may be deemed to match a given link relationship from the set of link relationships when the object ID matches a link relationship ID of a link relationship from the set of valid link relationships. In one embodiment of the technology, step 304 includes performing an intersection between the set of valid link relationships and the object IDs obtained in step 302. The result of step 304 is a set of link relationships are subsequently provided to the web server.

In step 306, zero or more link relationships are received by the web server from the link relationship manager. Each of the link relationships (see FIG. 2, 208) includes a link ID and a URL.

In step 308, the HTML for the web page and the link relationships obtained in step 306 are provided to the device. The web browser subsequently processes the HTML in order to render the web page for the user to view. In one embodiment of the technology, the HTML includes a reference to a link relationship evaluator (i.e., a script that is executed by the web browser, e.g., a JavaScript file). The web browser subsequently obtains the link relationship evaluator from the web application (e.g., using an HTTP GET request). The link relationship evaluator is subsequently executed by the web browser. More specifically, the link relationship evaluator obtains an object ID for each object on the webpage and then determines if the web server had provided a corresponding link relationship. In one embodiment of the technology, the object ID has a corresponding link relationship if there is a link relationship that includes a link relationship ID that matches the object ID.

In step 310, the link relationship evaluator permits the display of all objects for which there is an associated link relationship (as determined in step 308). If a given object does not have an associated link relationship, then the object is not displayed on the web page.

FIG. 4 shows a method for processing user generated events in a web application in accordance with one or more embodiments of the technology.

In step 400, the web browser detects that the user has selected an object displayed in the web page. For example, the user clicks or otherwise selects a button. The detection of the selection of the object triggers an action associated with the object.

In step 402, the action, which is triggered by the detection of the selection of the object, is performed in order to obtain inputs. More specifically, as discussed above, one or more inputs for a data service (which is associated with the object as discussed in FIG. 2) are obtained. In one embodiment of the technology, the action is executed within an execution environment provided by the web browser.

In step 404, the URL associated with the object (i.e., the object selected by the user in step 400) is obtained. In one embodiment of the technology, the URL may be obtained by using the object ID as a key to identify a matching link relationship. Said another way, a link relationship that includes a link relationship ID that matches the aforementioned object ID is identified. The URL associated with the identified link relationship is subsequently obtained.

In step 406, a data service request is generated using the URL along with the inputs obtained in step 404. In one embodiment of the technology, the data service request is an AJAX request and the URL, obtained by the link relationship, is updated to include the inputs obtained in step 404 in order to generate an updated URL. The updated URL is subsequently included within the AJAX request. The data service request is subsequently sent to the data service (FIG. 1, 104).

In step 408, the web application subsequently receives a response from the data service (i.e., a response the data service request). The response may then be used or otherwise provided to another entity on the web page or another entity associated with the web page.

In step 410, a subsequent action may be performed on the web page based on the response received in step 408.

Figure 5A:
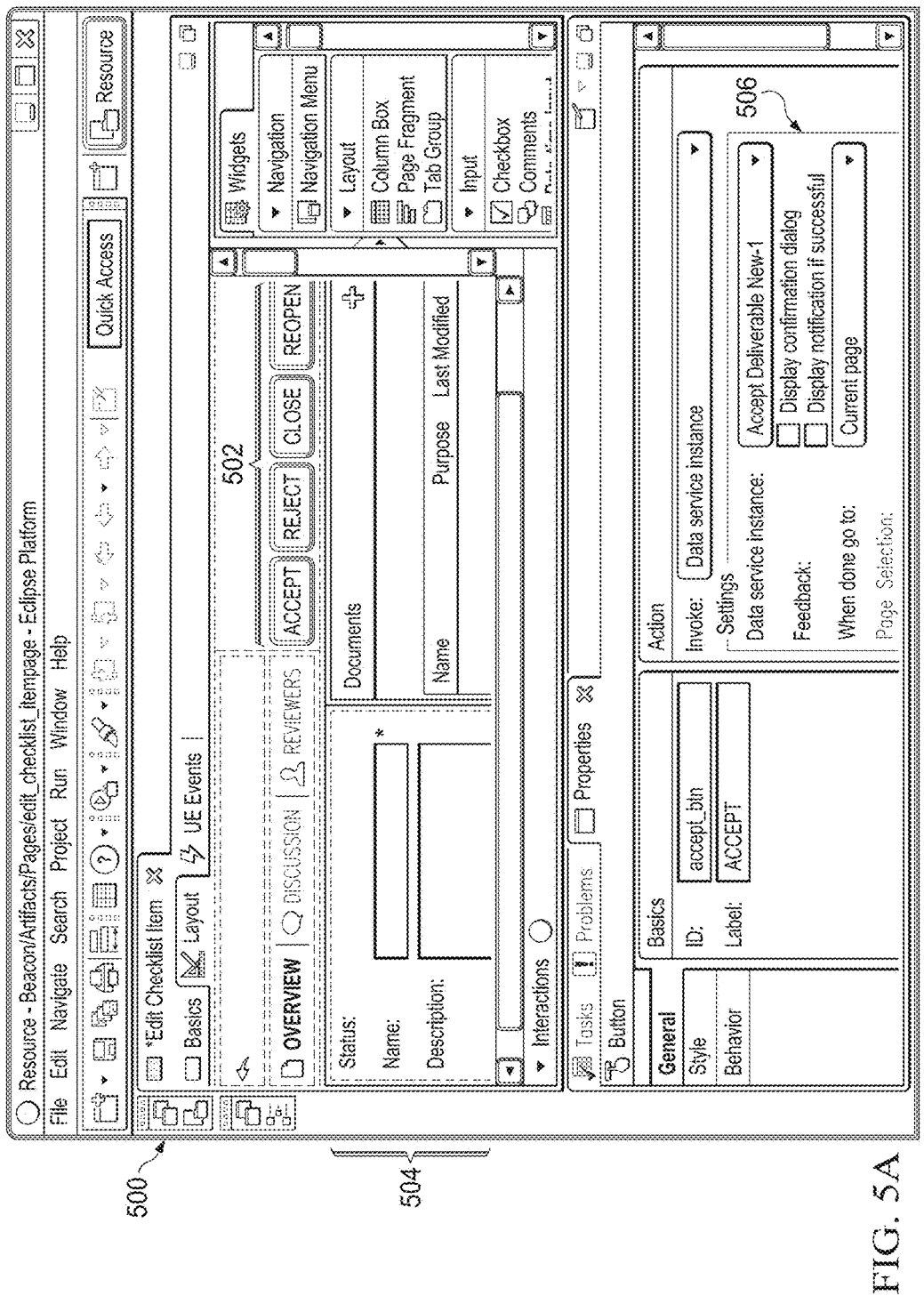
Figure 5B:
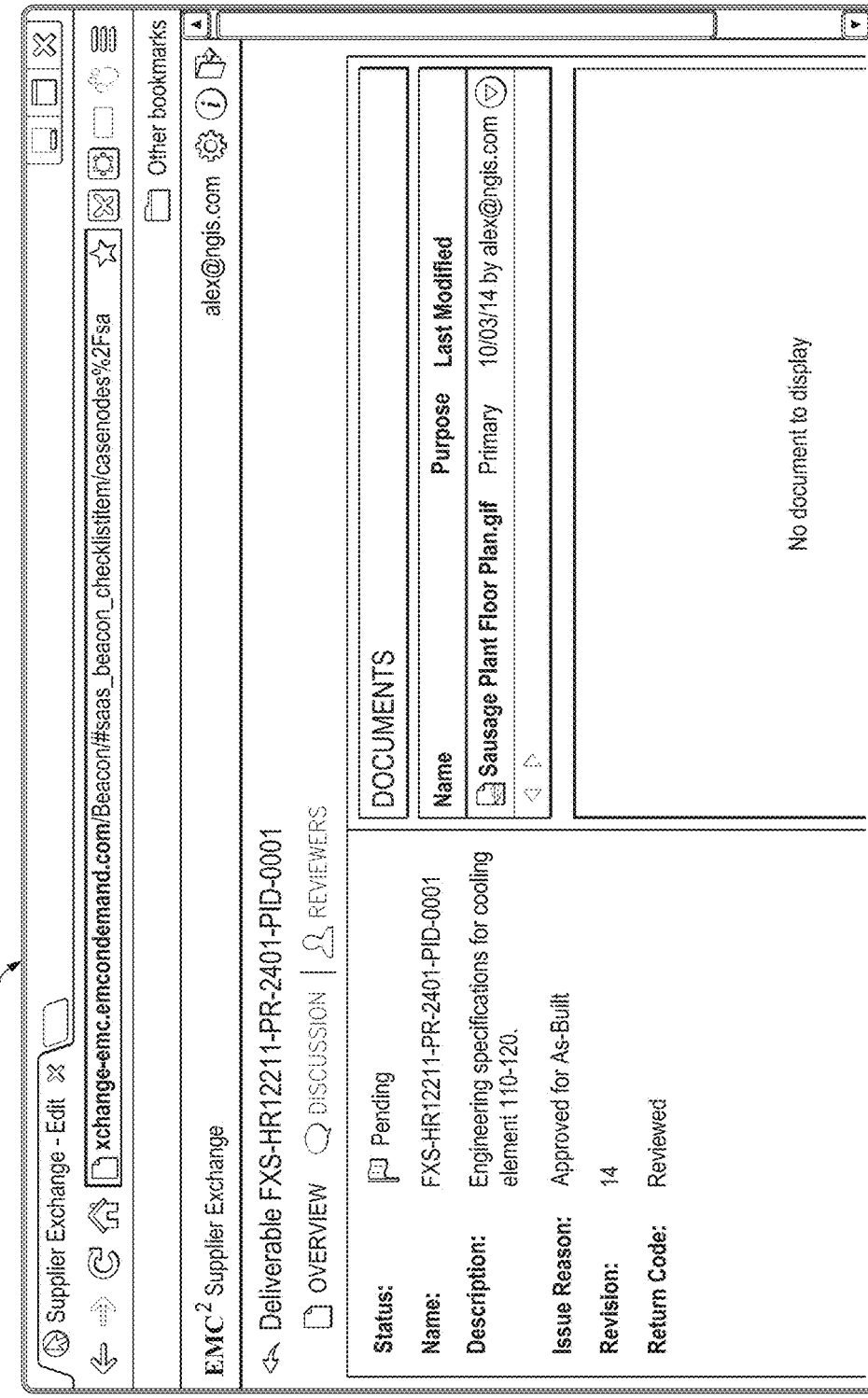

FIGS. 5A-5C show examples in accordance with one or more embodiments of the technology. The examples are not intended to limit the scope of the technology.

Referring to FIG. 5A, FIG. 5A shows a screenshot (500) of an integrated development environment that a web application designer may use to build a web application. In the IDE, the web application designer may create objects (e.g., ACCEPT button, REJECT button, DELETE button, REOPEN button). Further each of the aforementioned objects is associated with an Object ID, i.e., ACCEPT button is associated with object ID=ACCEPT, REJECT button is associated with object ID=REJECT, DELETE button is associated with object ID=DELETE, and REOPEN button is associated with object ID=REOPEN). These objects may be configured to be optionally displayed depending on the context of the web application. The web application designer may also include other visual content on a given webpage without departing from the technology, e.g., Status, Name, Description, (504), where such visual content is displayed on the web page regardless of the context of the web application. Further, each of the objects (502) may be associated with an action (e.g., 506).

For purposes of this example assuming that there resource is only a single resource that is available for the web application and that the resource is defined in JSON, as follows:

| Resource |
|---|
| "name": "content", "type": "ecm20n_refdoc", "definition": "http://10.31.69.74:8000/Testapp20/types/contents/ecm20n_refdoc", "properties": {<br>  "r_creation_date": "2014-11-14T16:25:02.000+05:30",<br>  "r_object_type": "ecm20n_refdoc",<br>  "a_content_type": "pdf",<br>  "iscustdoc": false,<br>  "refdoccopies": 0,<br>  "owner_name": "UserA",<br>  "refdocversion": 0.0,<br>  "i_folder_id": ["0b01e2408001ce41"],<br>  "r_modify_date": "2014-11-14T16:28:04.000+05:30",<br>  "r_object_id": "0901e2408001f4cf",<br>  "r_creator_name": "UserA",<br>  "object_name": "InsuranceGuide101.pdf",<br>  "r_version_label": ["1.0", "CURRENT"],<br>  "r_modifier": "UserB",<br>  "i_chronicle_id": "0901e2408001f4cf"<br>}, "fragments": { }, "links": [<br>  {<br>    "rel": "ACCEPT",<br>    "href": "contents/ecm20n_refdoc/0901e2408001f4cf"<br>  },<br>  {<br>    "rel": "REJECT",<br>    "href": "contents/ecm20n_refdoc/0901e2408001f4cf/"<br>  },<br>  {<br>    "rel": "CLOSE",<br>    "href": "contents/ecm20n_refdoc"<br>  },<br>  {<br>    "rel": "REOPEN ",<br>    "href": "contents/ecm20n_refdoc/0901e2408001f4cf/versions?version-policy=current-version"<br>  },<br>]} |

Referring to FIG. 5B, consider a scenario in which a web application that includes the web page shown in FIG. 5A is deployed and assume that User A authored and uploaded that document entitled "Engineering specifications for cooling element 110-120" to the web application in order to permit other users to review the document. When User A logs into the web application, User A sees the screenshot (508) shown in FIG. 5B. As shown in FIG. 5B, none of the objects (e.g., ACCEPT button, REJECT button, DELETE button, REOPEN button) that are on the web page are visible to User A. Specifically, when User A logged into the web application, the context of the web application was set to the context that was associated with the user. In this example, because User A is the author of the document, the context associated with User A is author. Based on this context the Resource Manager provides an empty set of link relationships to the link relationship manager because none of the aforementioned buttons are to be displayed to a user with a context of "author". Accordingly, when the web browser attempts to render the webpage shown in FIG. 5B, the link relationship evaluator does not identify any link relationships associated with the following objects: ACCEPT button, REJECT button, DELETE button, REOPEN button. Accordingly, the link relationship evaluator prevents any of the aforementioned buttons from being displayed to User A.

Referring to FIG. 5C, consider a scenario in which User B, who is a reviewer of documents uploaded by User A, logs into the web application. When User B logs into the web application, User B sees the screenshot (510) shown in FIG. 5C. As shown in FIG. 5C, certain objects are shown (e.g., ACCEPT button, REJECT button) and certain objects are not shown (e.g., DELETE button, REOPEN button). Specifically, when User B logged into the web application, the context of the web application was set to the context that was associated with the user. In this example, because User B is a reviewer of the document User A uploaded, the context associated with User B is "reviewer". Based on this context, the Resource Manager provides a set of link relationships to the link relationship manager that includes two link relationships (i.e., a set with a cardinality of two): (i) {"rel": "ACCEPT","href": "contents/ecm20n_refdoc/ 0901e2408001f4cf"}, and (ii) {"rel": "REJECT", "href": "contents/ecm20n_refdoc/0901e2408001f4cf/"}. Accordingly, when the web browser attempts to render the webpage shown in FIG. 5C, the link relationship evaluator identifies link relationships associated with the ACCEPT button and the REJECT button. However, the link relationship evaluator does not identify any link relationships with the DELETE button and the REOPEN button. Accordingly, the link relationship evaluator permits the ACCEPT button and the REJECT button to be displayed, and prevents the DELETE button and the REOPEN button from being displayed to User A.

One or more embodiments of the technology enable web application designers to build web applications that control access to various resources via the web application by using link relationships to control whether an object is displayed on a given webpage, where the link relationships are context based. Further, embodiments of the technology enable data services to be accessed using URLs that are provided within the link relationships that are associated with the displayed object.

One or more embodiments of the technology may also be used to determine whether a given navigation object—such as a "Next" button or a "Previous" button should be displayed on a given webpage. For example, the resource manager may provide valid link relationships to the link relationship manager for one or more navigation objects, where the determination of whether there is a valid link relationship corresponding to a navigation object is based on whether a resource is available to the current user on another webpage (e.g., a prior or subsequently webpage). If the resource is available on another webpage, then the appropriate link relationship may be provided to the link relationship manager. The aforementioned link relationship may ultimately be sent to the device (see e.g., FIG. 3), where it is processed as described, for example, in step 310.

Figure 6:
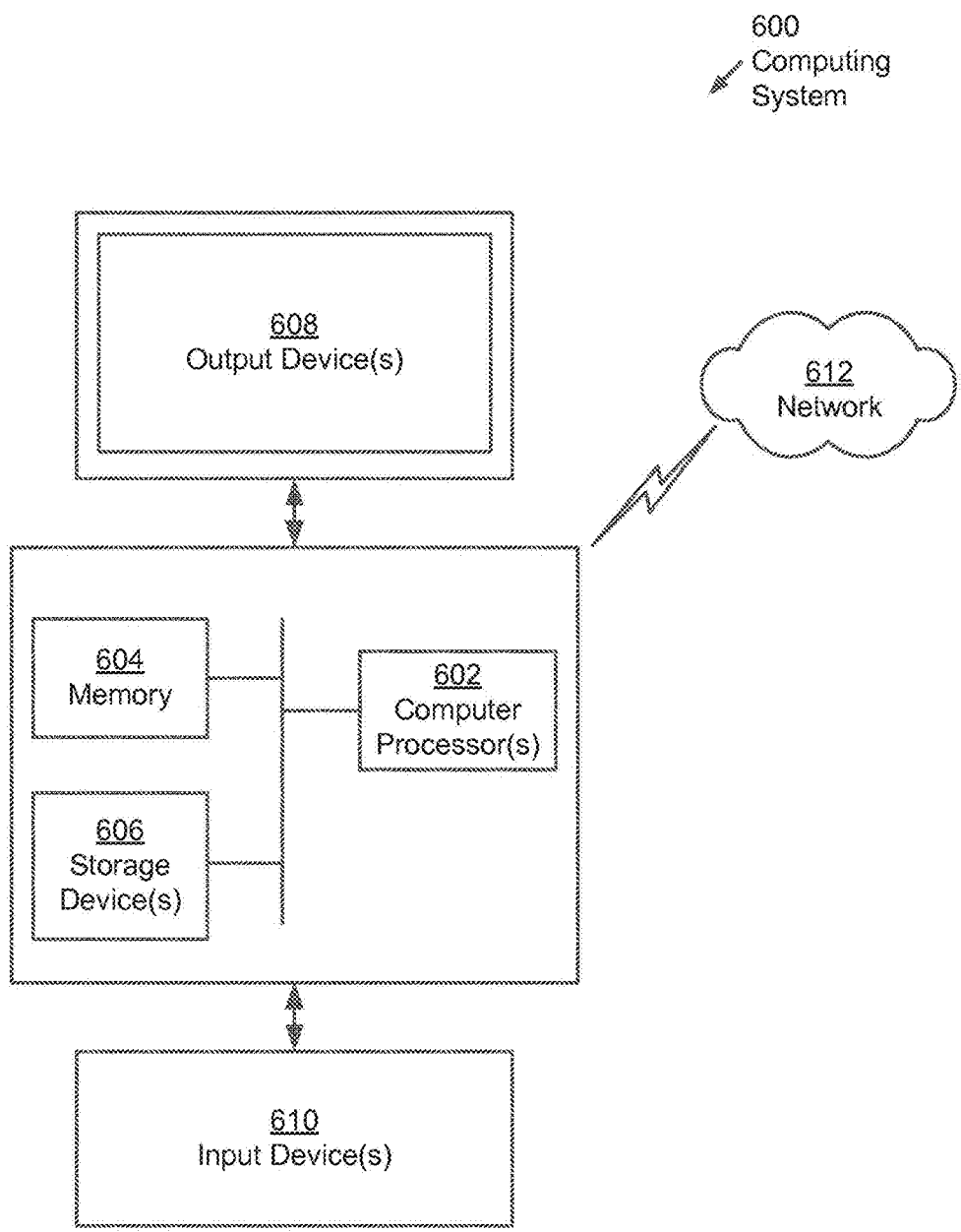
FIG. 6 shows an example computing system in accordance with one or more embodiments of the technology.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disc (CD) drive or digital versatile disc (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A non-transitory computer readable medium comprising computer readable program code executable by a processor to:
   receive over a network, at a server, a request from a device to transition to a webpage in a web application;
   in response to the request:
      obtain, by the server, a set of object identifiers, wherein each object identifier in the set of object identifiers is associated with a unique object on the webpage;
      provide the set of object identifiers to a link relationship manager;
      receive, from the link relationship manager, a set of link relationships, wherein each link relationship in the set of link relationships corresponds to an object identifier from the set of object identifiers; and
      provide the set of link relationships and HTML to render the webpage to the device, wherein the HTML to render the webpage includes a reference to a script executable by a browser to determine each link relationship in the set of link relationships returned by the server and only permit objects that are associated with a link relationship from the set of link relationships to be displayed on the device.

2. The non-transitory computer readable medium of claim 1, wherein said computer readable program code is further executable to:
determine a set of valid link relationships based on a current context of the web application;
configure the link relationship manager with the set of valid link relationships; and
generate the set of link relationships to return in response to the request based on the set of object identifiers and the set of valid link relationships.

3. The non-transitory computer readable medium of claim 2, wherein the current context of the web application is determined based on a current user of the device that is using the web application.

4. The non-transitory computer readable medium of claim 2, wherein the set of valid link relationships corresponds to possible link relationships that are associated with at least one resource that is being used by the web application.

5. The non-transitory computer readable medium of claim 2, wherein generating the set of link relationships to return in response to the request based on the set of object identifiers and the set of valid link relationships comprises performing an intersection between the set of object identifiers and the set of valid link relationships.

6. The non-transitory computer readable medium of claim 2, wherein the set of valid link relationships is provided to the link relationship manager in a JavaScript Object Notation (JSON) formatted file.

7. The non-transitory computer readable medium of claim 1, wherein a cardinality of the set of link relationships is less than a cardinality of the set of object identifiers.

8. The non-transitory computer readable medium of claim 1, wherein at least one link relationship in the set of link relationships comprises a uniform source location (URL).

9. The non-transitory computer readable medium of claim 8, wherein the at least one link relationship in the set of link relationships further comprises a link relationship identifier, wherein the link relationship identifier is associated with an associated object identifier from the set of object identifiers.

10. The non-transitory computer readable medium of claim 8, wherein the URL comprises information for a data service request.

11. The non-transitory computer readable medium of claim 1, wherein the computer readable program code is further executable to:
include in at least one link relationship in the set of link relationships, information for a data service request;
receive the data service request comprising a uniform source location (URL), at least a portion of the URL including the information for the data service request from the at least one link relationship; and
provide, in response to the data service request, requested data to the web application.

12. The non-transitory computer readable medium of claim 1, wherein at least one unique object on the webpage is selected from a button and a context menu.

13. A method comprising:
receiving over a network, at a server, a request from a device to transition to a webpage in a web application;
in response to the request:
obtaining, by the server, a set of object identifiers, wherein each object identifier in the set of object identifiers is associated with a unique object on the webpage;
provide the set of object identifiers to a link relationship manager;
receive, from the link relationship manager, a set of link relationships, wherein each link relationship in the set of link relationships corresponds to an object identifier from the set of object identifiers; and
provide the set of link relationships and HTML to render the webpage to the device, wherein the HTML to render the webpage includes a reference to a script executable by a browser to determine each link relationship in the set of link relationships returned by the server and only permit objects that are associated with a link relationship from the set of link relationships to be displayed on the device.

14. The method of claim 13, further comprising the server:
determining a set of valid link relationships based on a current context of the web application;
configuring the link relationship manager with the set of valid link relationships; and
generating the set of link relationships to return in response to the request based on the set of object identifiers and the set of valid link relationships.

15. The method of claim 14, wherein the current context of the web application is determined based on a current user of the device that is using the web application.

16. The method of claim 14, wherein the set of valid link relationships corresponds to possible link relationships that are associated with at least one resource that is being used by the web application.

17. The method of claim 14, wherein generating the set of link relationships to return in response to the request based on the set of object identifiers and the set of valid link relationships comprises performing an intersection between the set of object identifiers and the set of valid link relationships.

18. The method of claim 14, wherein the set of valid link relationships is provided to the link relationship manager in a JavaScript Object Notation (JSON) formatted file.

19. The method of claim 13, wherein a cardinality of the set of link relationships is less than a cardinality of the set of object identifiers.

20. The method of claim 13, wherein at least one link relationship in the set of link relationships comprises a uniform source location (URL).

21. The method of claim 20, wherein the at least one link relationship in the set of link relationships further comprises a link relationship identifier, wherein the link relationship identifier is associated with an associated object identifier from the set of object identifiers.

22. The method of claim 20, wherein the URL comprises information for a data service request.

23. The method of claim 13, further comprising:
including in at least one link relationship in the set of link relationships, information for a data service request;
receiving, at the server, the data service request, the data service request comprising a uniform source location (URL), at least a portion of the URL including the information for the data service request from the at least one link relationship; and
providing, in response to the data service request, requested data to the web application.

24. The method of claim 13, wherein at least one unique object on the webpage is selected from a button and a context menu.

25. A system comprising:
- a web server having a web server processor and web server non-transitory computer readable medium, the web server non-transitory computer readable medium comprising instructions executable by the web server processor to:
  - receive over a network, at a server, a request from a device to transition to a webpage in a web application;
  - in response to the request:
    - obtain, by the server, a set of object identifiers, wherein each object identifier in the set of object identifiers is associated with a unique object on the webpage;
    - provide the set of object identifiers to a link relationship manager;
    - receive, from the link relationship manager, a set of link relationships, wherein each link relationship in the set of link relationships corresponds to an object identifier from the set of object identifiers; and
    - provide the set of link relationships and HTML to render the webpage to the device, wherein the HTML to render webpage includes a reference to a script executable by a browser to determine each link relationship in the set of link relationships returned by the server and only permit objects that are associated with a link relationship from the set of link relationships to be displayed on the device;
- a resource manager comprising a resource manager processor and a resource manager non-transitory computer readable medium, the resource manager non-transitory computer readable medium storing instructions executable by the resource manager processor to:
  - determine a set of valid link relationships based on a current context of the web application; and
  - provide the set of valid link relationships to the link relationship manager;
- the link relationship manager, the link relationship manager comprising a link relationship manager processor and a link relationship manager non-transitory computer readable medium storing instructions executable by the link relationship manager processor to:
  - receive the set of object identifiers from the web application;
  - receive the set of valid link relationships from the resource manager;
  - generate the set of link relationships to provide to the web application busing the set of object identifiers and the set of valid link relationships; and
  - provide the set of link relationships to the web application.

* * * * *